United States Patent [19]

Allen et al.

[11] Patent Number: 5,137,106
[45] Date of Patent: Aug. 11, 1992

[54] TRANSMISSION CONTROL FOR ARTICULATED TRACTORS

[75] Inventors: Christopher L. Allen; Craig E. Miller, both of Winnipeg, Canada

[73] Assignee: Ford New Holland, Inc., New Holland, Pa.

[21] Appl. No.: 707,498

[22] Filed: May 30, 1991

[51] Int. Cl.⁵ .................. B60K 17/358; B60K 20/00; F16C 1/12
[52] U.S. Cl. .................... 180/235; 180/336; 74/473 R; 74/501.6
[58] Field of Search ............. 180/235, 336, 332, 315; 74/473 R, 501.5 R, 501.5 H, 501.6; 280/419, 460.1, 400

[56] References Cited

U.S. PATENT DOCUMENTS

| | | | |
|---|---|---|---|
| 1,736,330 | 11/1929 | Schmidt | 180/336 X |
| 4,459,870 | 7/1984 | Gill et al. | 74/501.6 X |
| 4,483,211 | 11/1984 | Hurlow | 74/473 R |
| 4,653,341 | 3/1987 | Ferrario | 74/473 R X |
| 5,000,059 | 3/1991 | Barnard | 74/501.6 X |

FOREIGN PATENT DOCUMENTS 1219683  1/1971  United Kingdom ............ 74/473 R

*Primary Examiner*—David M. Mitchell
*Assistant Examiner*—Florian Zeender
*Attorney, Agent, or Firm*—Larry W. Miller; Frank A. Seemar

[57] ABSTRACT

A control linkage for actuating transmission shifts in an articulated tractor having a transmission and operator controls on opposing sides of the articulation axis is disclosed wherein an offset connecting rod is connected to the shift control arm of the transmission which is located proximate to the articulation axis for the tractor. A push/pull cable is detachably connected to the offset connecting arm at a position remote from the shift control arm such that the connection between the push/pull cable and the offset connecting rod is further from the articulation axis than the shift control arm. The rod portion of the push/pull cable is restrained from non-axial movement relative to the sheath portion of the cable by a bracket affixed to the transmission housing.

11 Claims, 5 Drawing Sheets

TRANSMISSION CONTROL FOR ARTICULATED TRACTORS

BACKGROUND OF THE INVENTION

The present invention relates generally to articulated tractors and, more particularly, to a control linkage for effecting a shifting of a transmission positioned proximate to the articulation axis of the tractor.

Articulated tractors typically include two halves joined to each other by pivot mechanism defining a generally vertically oriented articulation axis, with each half being supported by a pair of ground engaging wheels rotatably mounted in a fixed orientation relative to each tractor half to provide a mobile support of the articulated tractor over the ground. Steering is accomplished by pivoting the two halves relative to each other about the articulation axis, usually by actuation of one or more hydraulic cylinders interconnecting the two tractor halves on opposing sides of the articulation axis, as compared to the steering action of a non-articulated tractor which is accomplished through a pivotal movement of at least one pair of wheels.

In typical configurations, one-half of the articulated tractor carries the power components, such as the engine, transmission, and major drive assemblies, while the other half of the articulated tractor supports the operator's station, including control levers, steering wheel, switches, etc. for controlling the operation of the tractor and operative components thereof. The transmission on such articulated tractors provides two or more speed ranges for motive operation of the tractor at any given output from the engine. Some such tractors are hydraulically driven in that the engine drives a hydraulic pump which in turn delivers a flow of hydraulic fluid under pressure to a hydraulic motor operably connected to the transmission.

The transmission will have a pivotable shift control arm which is manipulated to change the speed ranges of the transmission and which is connected to a range select lever in the operator's control station by a push/pull cable. An inherent problem with cable controls on an articulated vehicle in which the operator's control station is supported on one-half of the tractor while the transmission is located on the other half of the tractor on the opposite side of the articulation axis is that the articulating nature of the tractor applies many cycles of reversed bending loads on the push/pull cable itself. This type of loading has a dramatic effect on the fatigue life of push/pull cables. This problem is heightened by spatial configurations in which the transmission is supported on the frame of the articulated tractor adjacent the articulation axis.

One known solution to improving the fatigue life of cables in environments as described above has been to use an extra long cable that loops around the transmission housing and back to connect to the shift control arm of the transmission from the opposite direction. However, because of the high friction losses in such an extra long cable making several bends to loop around the transmission housing, the shifting of the transmission between ranges was made more difficult and created a "dead feel" because of the high friction loss. Furthermore, the requirement of an extra long cable adds undesirable additional costs to the manufacture of such a transmission control linkage.

Accordingly, it would be desirable to provide a transmission control linkage for articulated tractors, in which the transmission housing is located proximate to the articulation axis, which will eliminate the aforementioned fatigue problem while maintaining proper shift feel and operation.

SUMMARY OF THE INVENTION

It is an object of this invention to overcome the aforementioned disadvantages of the prior art by providing a transmission control linkage utilizing an offset connecting rod connected to the shift control arm and the push/pull cable.

It is an advantage of this invention that this transmission control linkage provides a fatigue resistant installation of a push/pull cable.

It is a feature of this invention that the push/pull cable can be connected to the shift control arm without being looped entirely around the transmission housing.

It is another advantage of this invention that the push/pull cables controlling transmission shifting is not subjected to high friction losses enabling a more sensitive feel of gear engagement back into the operator's control lever.

It is another feature of this invention that the offset connecting rod is pivotably connected to the shift control arm and to the push/pull cable.

It is still another feature of this invention that the connection between the push/pull cable and the offset connecting rod is further from the articulation axis than the connection between the offset connecting rod and the shift control arm.

It is still another advantage of this invention that the offset connecting rod enables the push/pull cable to be connected further away from the articulation axis to minimize the effects of reverse bending loads on the push/pull cable.

It is yet another feature of this invention that a bracket restrains the rod end of the push/pull cable from non-axial movement relative to the sheath portion of the cable.

It is another object of this invention to provide a transmission control linkage that is resistant to fatigue due to reversed bending loads imposed upon the cable while maintaining a sensitive feel on the operator's range select lever in the operator's control station to allow the operator to feel gear engagement within the transmission.

It is still another object of this invention to provide the transmission control linkage for an articulated tractor having the transmission mounted proximate to the articulation axis without subjecting a push/pull cable to high friction losses.

It is a further object of this invention to provide a transmission control linkage for an articulated tractor which is durable in construction, inexpensive of manufacture, carefree of maintenance, facile in assemblage, and simple and effective in use.

These and other objects, features and advantages are accomplished according to the instant invention by providing a control linkage for actuating transmission shifts in an articulated tractor having a transmission and operator controls on opposing sides of the articulation axis wherein an offset connecting rod is connected to the shift control arm of the transmission which is located proximate to the articulation axis for the tractor. A push/pull cable is detachably connected to the offset connecting arm at a position remote from the shift control arm such that the connection between the push- /pull cable and the offset connecting rod is further from the articulation axis than the shift control arm. The rod portion of the push/pull cable is restrained from non-axial movement relative to the sheath portion of the cable by a bracket affixed to the transmission housing.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
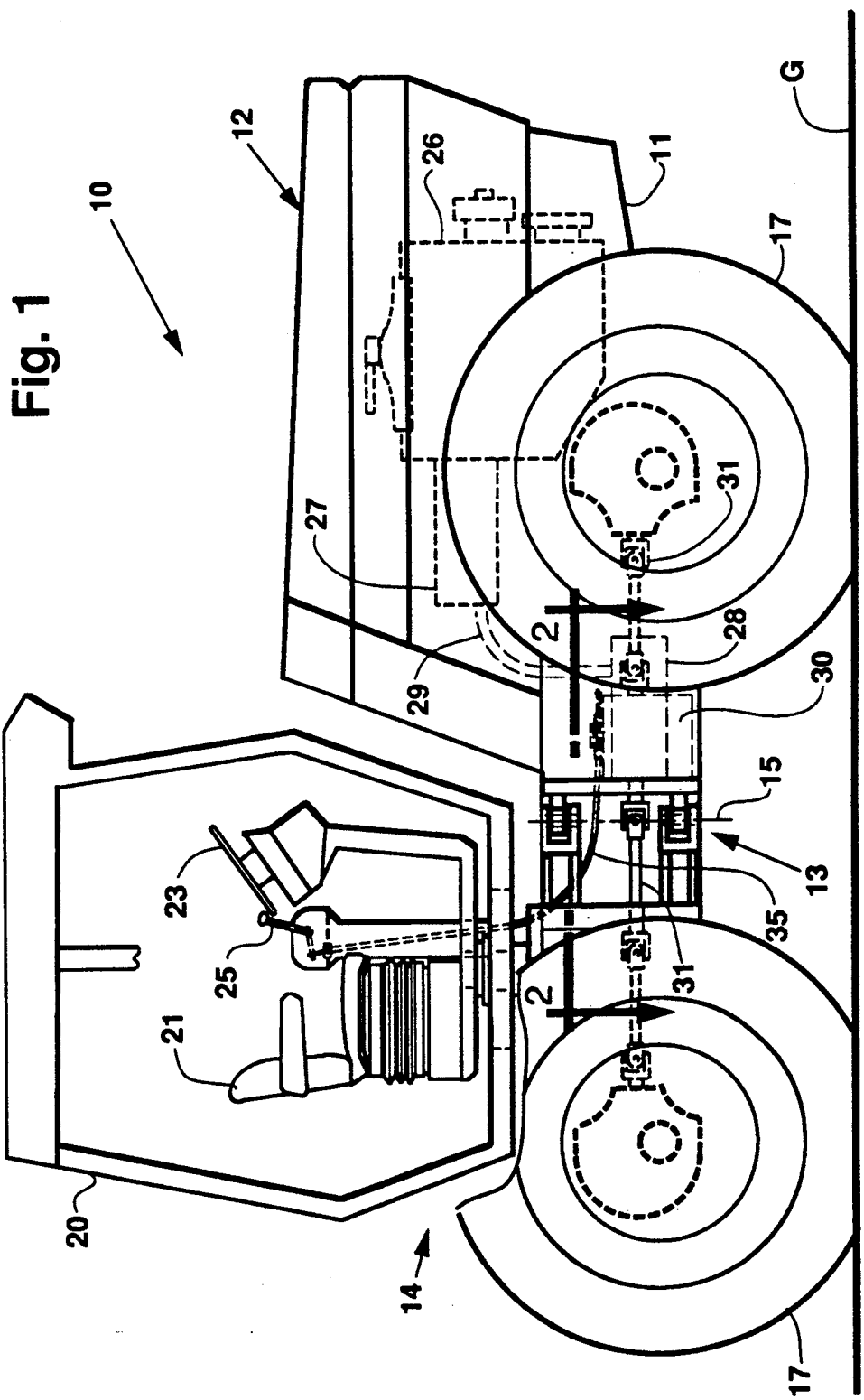
FIG. 1 is a side elevational view of an articulated tractor schematically depicting the operator's control station, engine, transmission, and other drive components.

Referring now to the drawings and, particularly, to FIG. 1, a side-elevational view of an articulated tractor can best be seen. The tractor 10 includes an articulated frame 11 configured in an engine end 12 and a cab end 14 pivotably connected by a pivot mechanism 13 defining a generally vertical articulation axis 15 therebetween. Each end 12, 14 of the tractor 10 is provided with a pair of transversely spaced ground wheels 17 rotatably supporting the frame 11 for mobile movement over the ground G.

The cab end 14 of the tractor 10 is provided with the operator's control station 20 in which is housed a seat 21 for support of the operator in control of the tractor 10. The control station 20 is provided with operative controls such as the steering wheel 23 for effecting turns of the articulated tractor 10 and a range select lever 25 for changing the speed ranges of the tractor transmission, as will be described in greater detail below. The engine end 12 of the articulated tractor 10 supports an engine 26 operably connected to a hydraulic pump 27 which provides a flow of hydraulic fluid under pressure through the hoses 29 to a hydraulic motor 28. The output of the hydraulic motor 28 provides rotational power to a transmission 30 supported by the frame 11 of the engine end 12 of the tractor 10 adjacent to the articulation axis 15 to provide operative power to the ground engaging wheels 17. A pair of drive assemblies 31 extend outwardly from the transmission 30 to provide operative power to the wheels 17 for each end 12, 14 of the tractor 10.

Figure 2:
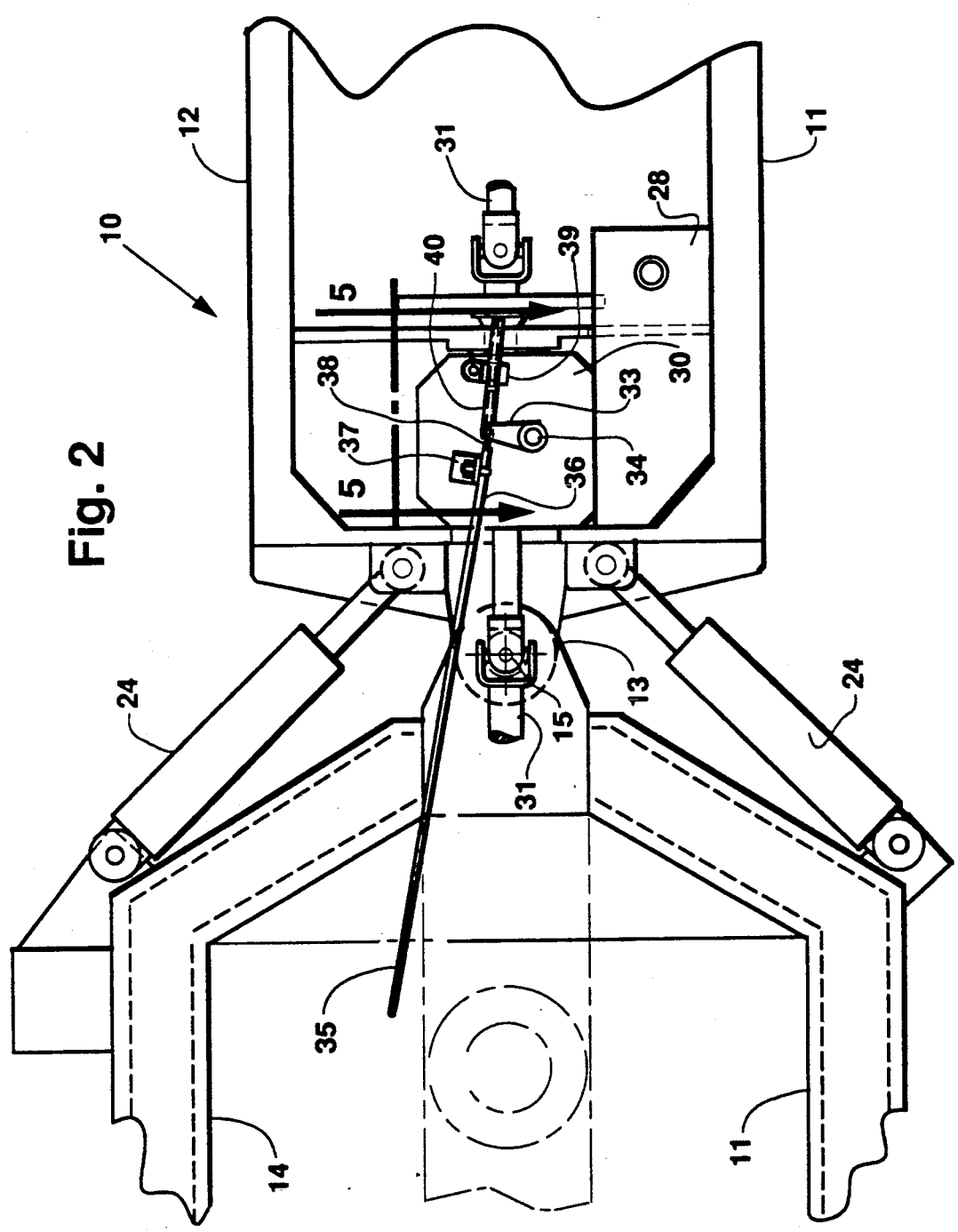
FIG. 2 is an enlarged partial cross-sectional view of the articulated tractor taken along lines 2—2 of FIG. 1 to show the transmission proximate to the articulation axis of the tractor and the control linkage for actuating transmission shifts.
Figure 5:
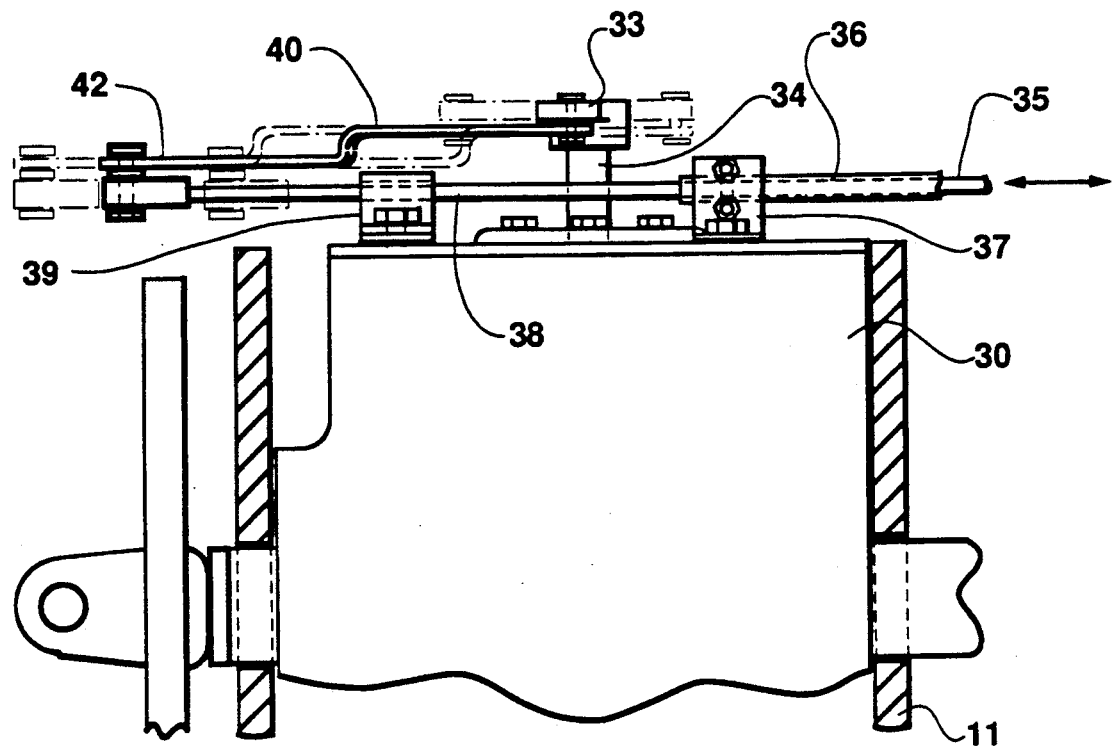
FIG. 5 is an enlarged partial cross-sectional view of the transmission control linkage corresponding to lines 5—5 of FIG. 2, the movement of the linkage being shown in phantom.

Referring now to FIGS. 1, 2 and 5, it can be seen that a push/pull cable 35 interconnects the range select lever 25 in the operator's control station 20 and a shift control arm 33 projecting upwardly from the transmission 30. The operation of the shift control arm 33 is well known in the art and controls a shifting of the speed ranges within the transmission 30 by pivotal movement of the shift control arm 33 to effect a rotation of the upwardly projecting shaft 34. The interconnection by the push/pull cable 35 between the range select lever 25 and the shift control arm 33 allows a pivotal movement of the range select lever 25 by the operator in the operator's control station 20 to effect a pivotable movement of the shift control arm 33 and a corresponding rotation of the shaft 34 to the transmission 30.

To place the transmission control linkage of the instant invention to proper perspective, reference is made to FIGS. 1, 2 and 6, in conjunction with which certain prior art control linkages will be described. A direct connection of the push/pull cable 35 to the shift control arm 33 of the transmission 30, as depicted in solid lines in FIG. 6, subjects the push/pull cable 35 to reversed bending loads due to the articulation of the tractor 10 about the pivot mechanism 13 defining the articulation axis 15 adjacent to the transmission 30. Such direct cable connections are subject to short life due to fatigue from this reversed bending loading.

Figure 6:
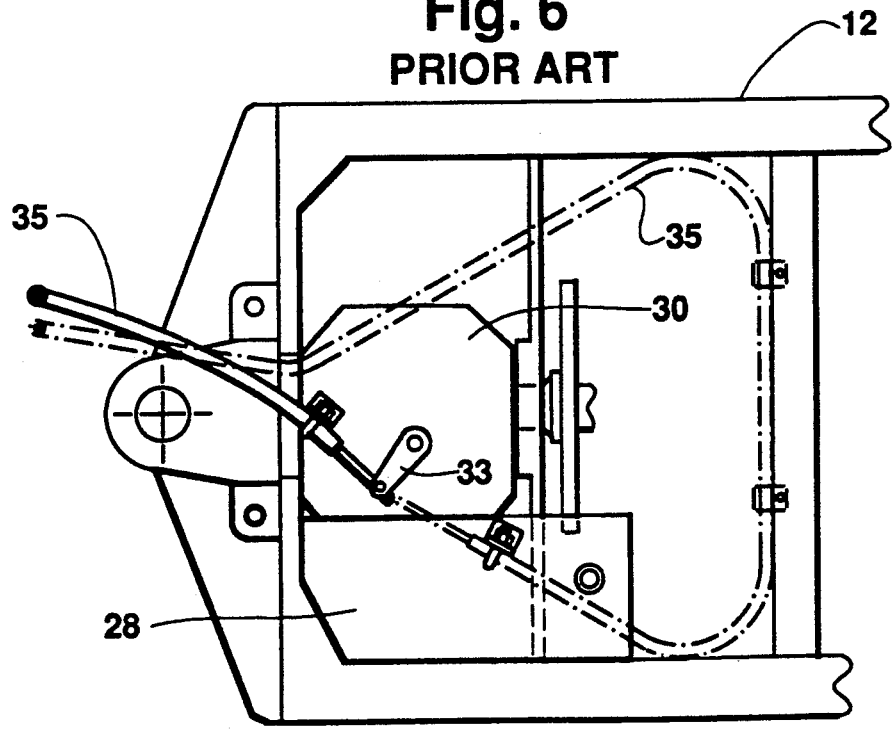
FIG. 6 is a schematic representation of the prior art transmission control linkages, the direct connection of the push/pull cable subject to fatigue problems being shown in solid lines while the extra long cable wrapped around the transmission housing subject to high friction loss is shown in phantom.

One known solution to this fatigue problem in such transmission push/pull cables is also depicted in phantom in FIG. 6. An extra long push/pull cable 35 is utilized to wrap around the transmission casing 30 to connect the shift control arm 33 from the reverse side thereof so that the cable 35 is not subjected to severe reversed bending loads from pivotal movement of the tractor about the articulation axis. As noted above, this solution incurs high friction losses due to the extra length of cable and the dramatic bends thereof to wrap around the transmission casing, resulting in a "dead feel" preventing the operator from feeling the gear shifting in the transmission. Furthermore, this solution involving an extra long length of cable requires greater shift effort due to the high friction losses incurred by the cable 35.

Referring now to FIGS. 2–5, the transmission control linkage comprising the instant invention can best be seen. The sheath portion 36 of the push/pull cable 35 is affixed to the transmission 30 by a first bracket 37 positioned proximate to the shift control arm 33. The rod portion 38 extending outwardly from the sheath portion 36 is pivotably connected to an offset connecting rod 40, which in turn is pivotably connected to the shift control arm 33. The offset connecting rod 40 extends from the shift control arm 33 away from the articulation axis 15 of the tractor 10 so as to provide a connection point at the remote end 42 thereof for the rod portion 38 of the push/pull cable 35 at a location spaced further from the articulation axis than the point of connection of the offset connecting rod 40 with the shift control arm 33. As can be seen best in FIG. 2, the offset connecting rod 40 extends substantially axially with respect to the cable 35 at generally 90 degrees to the major axis of the shift control arm 33 so as to be substantially aligned with the movement of the shift control arm required to effect selection between the different speed ranges. A second bracket 39 affixed to the transmission casing 30 restricts movement of the rod portion 38 of the push/pull cable 35 in any direction other than axially with respect to the sheath portion 36.

Figure 3:
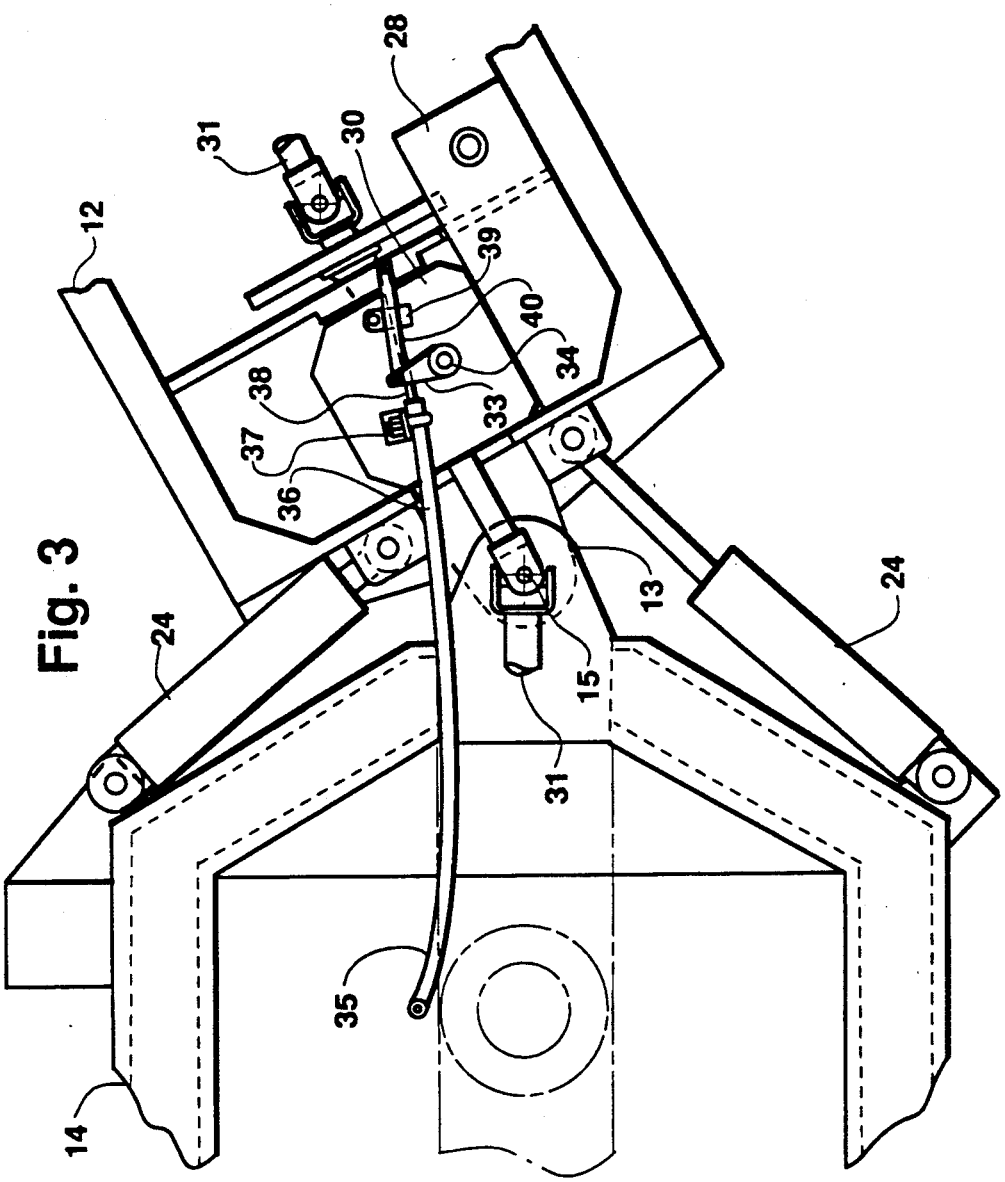
FIG. 3 is a partial cross-sectional view corresponding to the view of FIG. 2 with the engine end of the articulated tractor pivotably moved about the articulation axis relative to the cab end of the tractor.
Figure 4:
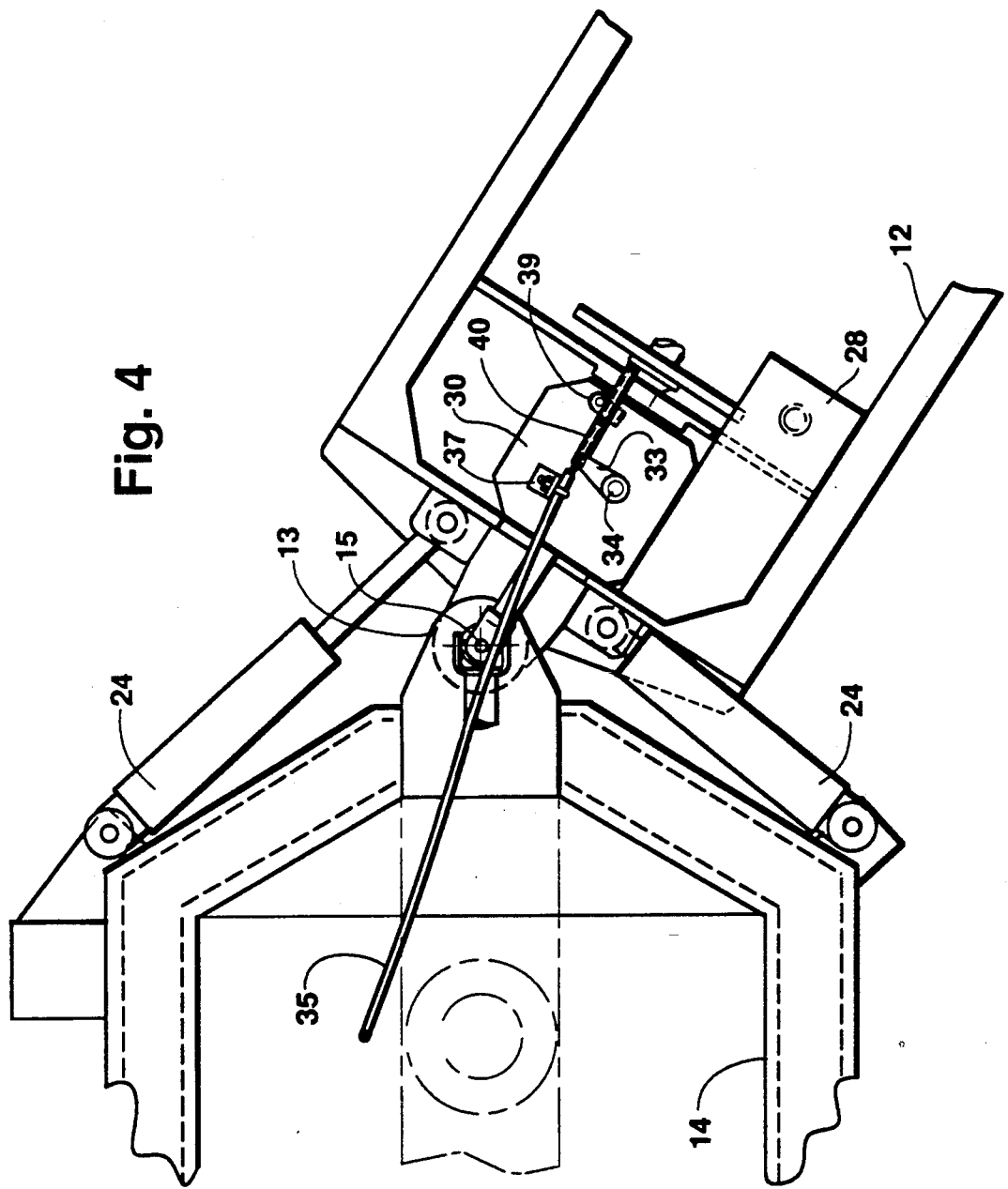
FIG. 4 is a partial cross-sectional view similar to that of FIGS. 2 and 3 with the engine end of the articulated tractor being pivotably rotated to the opposing direction from the seeing end of FIG. 3.

As can be seen in FIGS. 3 and 4, articulation of the engine end 12 of the articulated tractor 10 about the articulation axis 15 effected by relative expansion and contraction of the steering cylinders 24 operatively connected to the steering wheel 23 in the operator's control station 20, does not result in a great deal of reverse bending loading induced into the push/pull cable 35 because of the remote connection of the rod portion 38 to the shift control arm 33 through the intermediary of the offset connecting rod 40. As a result, the push/pull cable 35 is not subjected to high friction losses, enabling the operator to feel gear engagement in the transmission through the range select lever 25. The minimal effect of reverse bending loading on the cable 35 provides a resistance to fatigue failure in the cable 35 without requiring a more costly longer cable wrapping around the transmission 30.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an articulated vehicle having an articulated frame supported on the ground by wheels to permit movement of said frame over the ground, said frame including a generally vertical articulation axis; an engine supported on said frame to provide a source of operative power; a transmission operatively connected to said engine and to said wheels to provide a plurality of ranges of driving speed to said wheels for a given input speed of operative power to said transmission from said engine, said transmission including a movable shift control arm to permit a selective shifting of said transmission between said ranges of driving speed, said shift control arm being positioned adjacent said articulation axis; and an operator's control station supported on said frame and including a range select lever connected to said shift control arm by a push/pull cable, said range select lever and said shift control arm being positioned on opposing sides of said articulation axis, the improvement comprising:

an offset connecting rod connected to said shift control arm, said push/pull cable being detachably connected to said offset connecting rod at a position remote from said shift control arm such that the connection between said push/pull cable and said offset connecting rod is further from said articulation axis than said shift control arm.

2. The articulated vehicle of claim 1 wherein said push/pull cable has an outer sheath portion and an inner rod portion axially movable relative to said sheath portion, said sheath portion being restrained from movement by a first bracket positioned adjacent said shift control arm.

3. The articulated vehicle of claim 2 wherein said rod portion of said push/pull cable is restrained from non-axial movement by a second bracket.

4. The articulated vehicle of claim 3 wherein both said first and second brackets are affixed to said transmission.

5. The articulated vehicle of claim 3 wherein said offset connecting rod extends generally perpendicularly to said shift control arm so as to be substantially aligned with the movement of said shift control arm required to effect selection between said ranges of driving speed.

6. The articulated vehicle of claim 5 wherein said offset connecting rod is pivotally connected to both said shift control arm and said rod portion of said push/pull cable.

7. A transmission shift linkage for an articulated vehicle having an articulated frame including a generally vertically oriented articulation axis and ground engaging wheels supporting said frame for movement over the ground, an engine supported on said frame to provide operational power for said vehicle, a transmission operably connected to said engine and said wheels to provide a plurality of speed ranges of operation of said wheels for any given input speed of operation from said engine, said transmission having a shift control arm movably positioned to permit a shifting of said transmission between said speed ranges, and an operator's control station mounted on said frame to support an operator for control of said vehicle, comprising:

a shift lever movably mounted in said operator's station on one side of said articulation axis;

an offset connecting rod connected to a remote end of said shift control arm and extending outwardly therefrom in general alignment with the motion of said remote end during actuation thereof to effect changes in said speed ranges, said offset connecting rod being positioned on the opposing side of said articulation axis from said shift lever and extending from said remote end away from said articulation axis; and a push/pull cable interconnecting said shift lever and said offset connecting rod to transfer movement of said shift lever to said offset connecting rod, which in turn effects movement of said shift control arm to cause a shifting of the speed range of said transmission, said cable being connected to an end of said offset connecting rod furthest from said articulation axis.

8. The transmission shift linkage of claim 7 wherein said push/pull cable has a sheath portion and a rod portion movable relative to said sheath portion along an axis defined by the extension of said rod portion from said sheath portion, said sheath portion being constrained from movement relative to said transmission by a first bracket.

9. The transmission shift linkage of claim 8 wherein said rod portion of said push-pull cable is constrained from non-axial movement by a second bracket.

10. The articulated vehicle of claim 9 wherein said offset connecting rod is pivotally connected to both said shift control arm and said rod portion of said push/pull cable.

11. The articulated vehicle of claim 10 wherein said first bracket is affixed to said transmission adjacent said shift control arm.

* * * * *